United States Patent
Hobson

(10) Patent No.: US 7,191,328 B2
(45) Date of Patent: Mar. 13, 2007

(54) SYSTEM AND METHOD FOR USING AN EXTENSIBLE FIRMWARE INTERFACE (EFI) UTILITY TO BUILD AN EFI LAYER BETWEEN AN OPERATING SYSTEM AND A LEGACY BASIC INPUT/OUTPUT SYSTEM DURING A BOOT PROCESS

(75) Inventor: Louis B. Hobson, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 483 days.

(21) Appl. No.: 10/894,808

(22) Filed: Jul. 20, 2004

(65) Prior Publication Data

US 2006/0020780 A1    Jan. 26, 2006

(51) Int. Cl.
*G06F 15/177* (2006.01)
*G06F 9/00* (2006.01)

(52) U.S. Cl. .................................. 713/2; 713/1; 710/1

(58) Field of Classification Search .................... 713/1, 713/2; 710/1–74
See application file for complete search history.

(56) References Cited

U.S. PATENT DOCUMENTS

| 7,080,243 B2 * | 7/2006 | Ramiz et al. ................... 713/1 |
| 2005/0071618 A1 * | 3/2005 | Natu ............................... 713/1 |
| 2005/0204357 A1 * | 9/2005 | Garg et al. ..................... 718/1 |
| 2006/0047941 A1 * | 3/2006 | Lai ................................. 713/2 |

\* cited by examiner

*Primary Examiner*—Thomas Lee
*Assistant Examiner*—Anand B. Patel

(57) ABSTRACT

Disclosed is a system and a method for implementing an extensible firmware interface (EFI). In one embodiment, a system and a method pertain to launching an EFI utility during a boot process of a computer system, and building an EFI layer that resides between an operating system of the computer system and a legacy basic input/output system (BIOS) of the computer system using the EFI utility.

20 Claims, 5 Drawing Sheets

SYSTEM AND METHOD FOR USING AN EXTENSIBLE FIRMWARE INTERFACE (EFI) UTILITY TO BUILD AN EFI LAYER BETWEEN AN OPERATING SYSTEM AND A LEGACY BASIC INPUT/OUTPUT SYSTEM DURING A BOOT PROCESS

BACKGROUND

For years, personal computers (PCs) have used the so-called legacy basic input/output system (BIOS) to facilitate booting and to provide an interface between the computer operating system and various input/output (I/O) devices such as displays, keyboards, mice, and disk drives. Over the past several years, however, the Microsoft Corporation has been developing a new software interface, called the extensible firmware interface (EFI), that is expected to replace the legacy BIOS. The EFI provides a new model for the interface between operating systems and platform firmware and comprises data tables that contain platform-related information and boot and runtime service calls that are available to the operating system and its loader. In order to communicate with the EFI, the operating system must be specifically configured for use with the EFI, or other appropriate software must be developed to enable such communication.

Given that it appears that the PC industry will be transitioning to EFI-based systems, it is likely that future PCs will comprise the EFI. At least for the next few years, however, there will be many persons that will still use legacy-based operating systems that cannot communicate with the EFI. Accordingly, needed is an interim solution that supports both legacy BIOS and EFI so as to enable the use of either a legacy-based operating system or an EFI-based operating system.

Although both interface systems could be supported by installing both the legacy BIOS and the EFI in the system memory so that either is available for use, such a solution typically would require a larger system memory device (e.g., flash chip) to store both interface systems. Although such memory devices are available, their use would undesirably increase the cost of the PCs in which they are installed.

The Intel Corporation has proposed an alternative solution. Specifically, proposed is a backward-compatible solution in which the EFI layer is configured to emulate certain aspects of legacy BIOS operation so as to enable interface with legacy-based operating systems. In that solution, a compatibility support module (CSM) comprising a series of drivers chooses a legacy BIOS or EFI booting route depending upon the boot device(s) that is/are selected. Although this solution avoids the memory space problem identified above, such emulation is relatively complex and therefore requires significant time and resources to develop.

SUMMARY OF THE DISCLOSURE

Disclosed is a system and a method for implementing an extensible firmware interface (EFI). In one embodiment, a system and a method pertain to launching an EFI utility during a boot process of a computer system, and building an EFI layer that resides between an operating system of the computer system and a legacy basic input/output system (BIOS) of the computer system using the EFI utility.

BRIEF DESCRIPTION OF THE DRAWINGS

The disclosed system and method can be better understood with reference to the following drawings. The components in the drawings are not necessarily to scale.

DETAILED DESCRIPTION

Disclosed herein are embodiments of a system and method for implementing an extensible firmware interface (EFI). More particularly, disclosed are a system and method that comprise a legacy BIOS interface that is configured to, if desired and/or necessary, launch an EFI utility that installs an EFI layer between the BIOS and an EFI-based operating system during the boot process. With such operation, the system supports both legacy BIOS operation and EFI operation.

Figure 1:
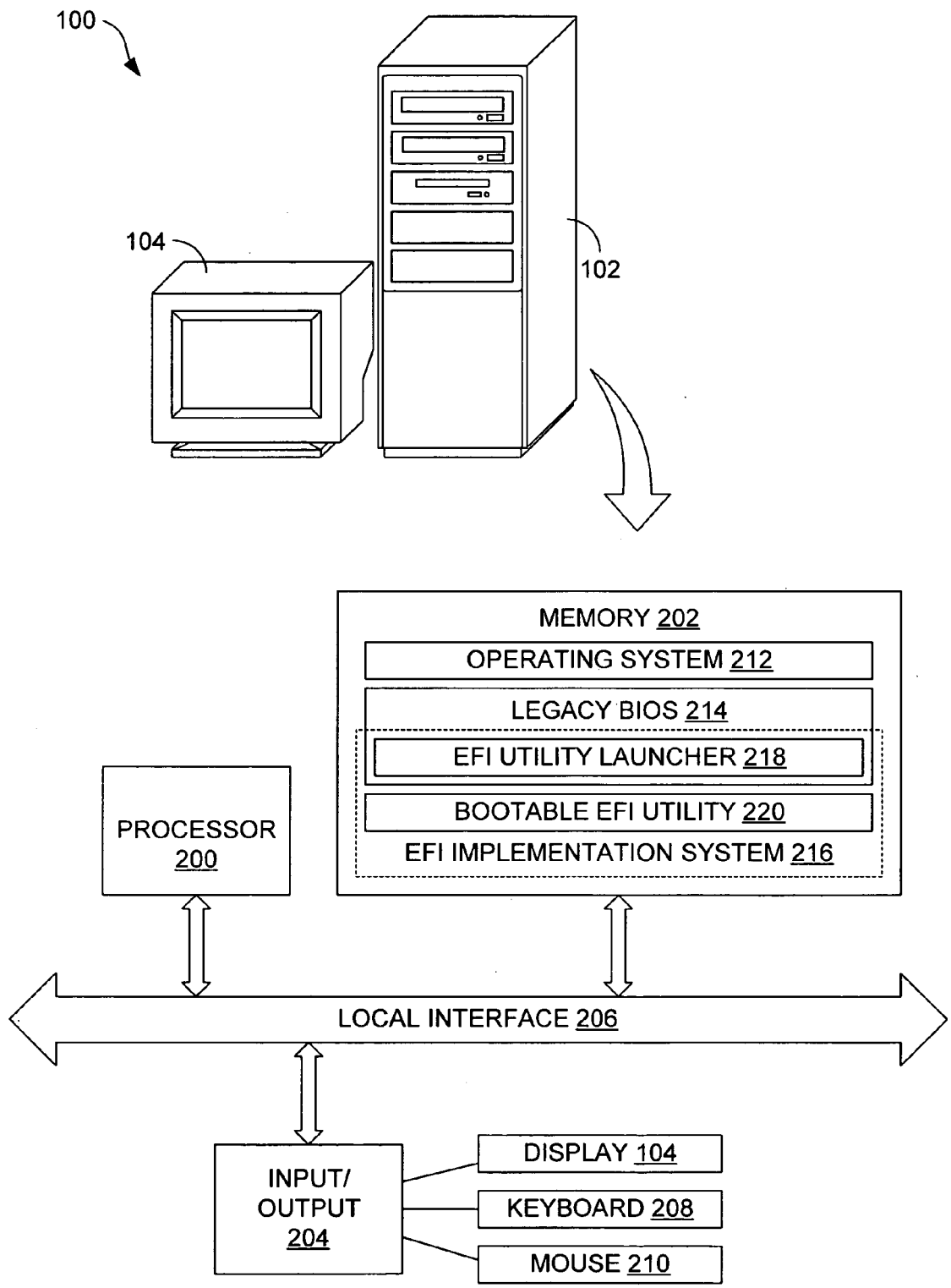
FIG. 1 is a schematic and block diagram of a computer system that incorporates a system for implementing an extensible firmware interface.

Referring now to the drawings, in which like numerals indicate corresponding parts throughout the several views, FIG. 1 illustrates a computer system 100 that incorporates a system for implementing an EFI and, more particularly, supporting both legacy BIOS and EFI operation. The computer system 100 comprises a central computing unit (CPU) 102 a display 104. Also illustrated in FIG. 1 is an example architecture for the CPU 102. In the illustrated embodiment, the CPU includes a processor 200, memory 202, and input/output components 204, each of which is connected to a local interface 206.

The processor 200 can include one or more microprocessors that control the logic of the digital devices of the computer system 100. The memory 202 includes any one of or a combination of volatile memory elements (e.g., RAM) and nonvolatile memory elements (e.g., read only memory (ROM), flash memory, hard disk, etc.).

The I/O components 204 comprise the components with which inputs and outputs can be exchanged between the CPU 102 and a user input/output device such as the display 104, a keyboard 208, and a mouse 210. In addition, the components 204 may, for example, comprise various ports, a modem, wireless transceiver, a telephonic interface, and a network card that enable communication with other devices.

The memory 202 comprises various programs including an operating system 212, a legacy BIOS 214, and an EFI implementation system 216. The operating system 212 controls the execution of various computer system software and provides scheduling, input-output control, file and data management, memory management, and communication control and related services. As is described in the following, the operating system 212 may comprise a legacy-based operating system or an EFI-based operating system depending upon the particular implementation. Indeed, the CPU 102 may, in some embodiments, comprise both a legacy-based operating system and an EFI-based operating system.

The EFI implementation system 216 comprises the various programs that are used to enable interface with an EFI-based operating system. As is indicated in FIG. 1, the EFI implementation system 216 comprises an EFI launcher 218 that is comprised by the legacy BIOS 214, and a bootable EFI utility 220 that is separate from the legacy BIOS 214. By way of example, the legacy BIOS 214 resides within a non-volatile memory device provided on the system circuit board of the CPU 102. The memory device may comprise a flash-based memory chip or an electrically-erasable, programmable read only memory (EEPROM). The memory device may be relatively small, for instance having a capacity of about 512 kilobytes (KB) so as to lower the cost of the device, and the CPU 102 in which it is provided.

The bootable EFI utility 220 is a utility that, when launched, builds an EFI as an interface layer between an operating system and a legacy BIOS. By way of example, the EFI utility 220 may comprise a publicly-available utility such as the EFI sample implementation source code (version 1.10.14.62) that is currently available from the Intel Corporation. Although use of that utility may be desirable due to its ready availability, other (e.g., later designed) versions of that utility or a custom-designed utility that is configured to build an EFI layer between an operating system and a legacy BIOS could be used instead.

Irrespective of its particular configuration, the EFI utility 220 resides outside of the legacy BIOS 214. With such a configuration, the legacy BIOS 214 may be installed on the aforementioned memory device without the need to increase the size of that device. By way of example, the EFI utility 220 resides within a host protected area (HPA) of a hard disk of the CPU 102. As is known, the HPA is an area of a computer hard disk that is available to the system BIOS but which is unknown and inaccessible to the operating system. In alternative arrangements, the EFI utility 220 may reside in another location, for instance on a bootable removable disk, such as a floppy disk, CD or DVD, that is inserted into a disk drive of the CPU 102.

Various programs (logic) have been described above. These programs can be stored on any computer-readable medium for use by or in connection with any computer-related system or method. In the context of this disclosure, a computer-readable medium is an electronic, magnetic, optical, or other physical device or means that contains or stores a computer program for use by or in connection with a computer-related system or method. Programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Figure 2:
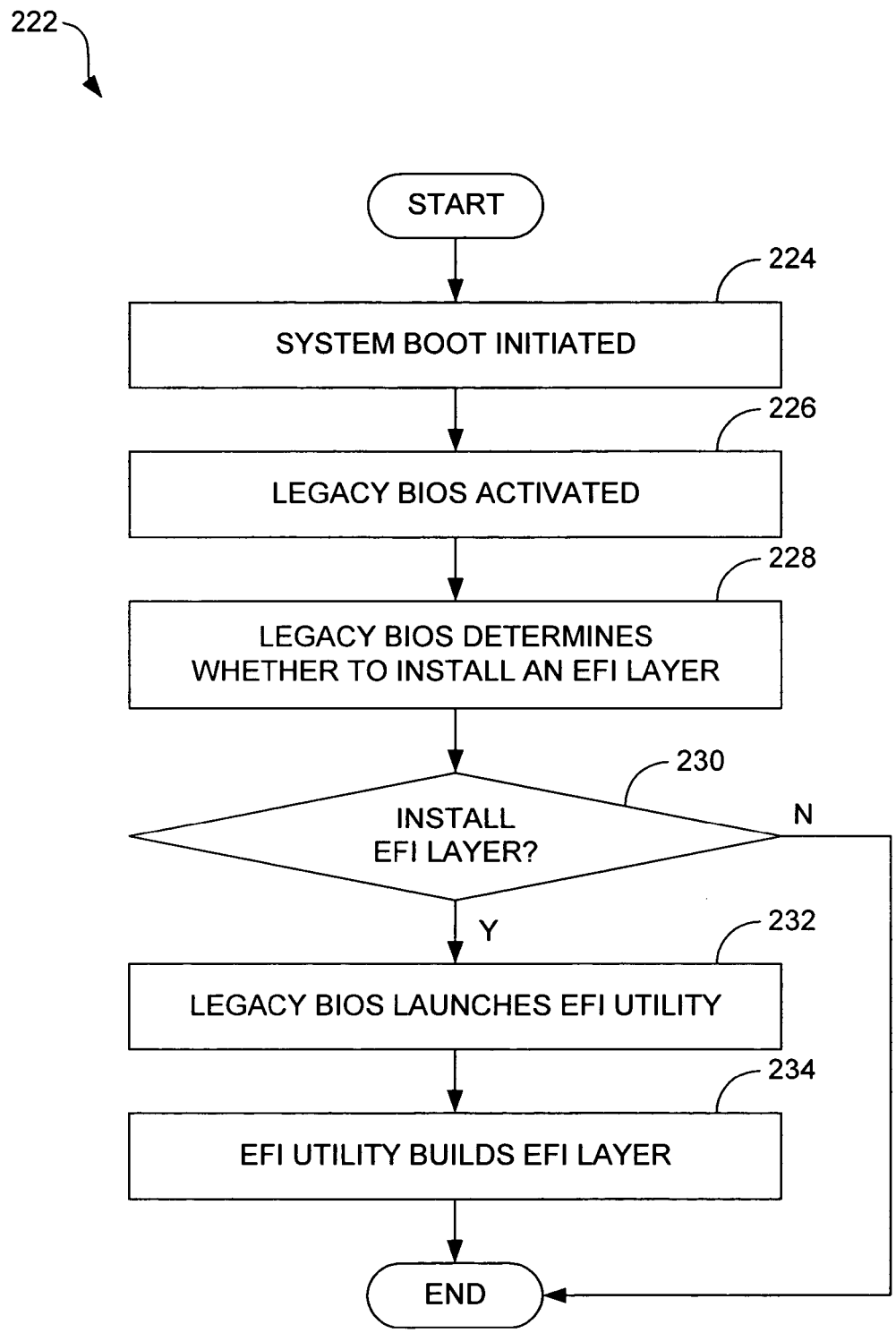
FIG. 2 is a flow diagram that illustrates an embodiment of a method for implementing an extensible firmware interface.

FIG. 2 is a flow diagram that describes a method 222 for implementing an EFI. Process steps or blocks in the flow diagrams of this disclosure may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Beginning with block 224 of FIG. 2, a computer system boot is initiated, for instance when the user turns on the power of the computer system or resets the computer system. As a result of the boot initiation, the legacy BIOS is activated, as indicated in block 226. After that activation, the legacy BIOS determines whether to install an EFI layer, as indicated in block 228. That determination can be input in various ways. By way of example, the determination is made in relation to a selection input by the user. For instance, if the computer system comprises an EFI-based operating system, the user may elect to install the EFI layer.

Referring next to decision block 230, flow from this point depends upon whether an EFI layer is to be installed. If not, flow for the EFI implementation portion of the boot process is terminated. In such a case, the legacy BIOS will complete the boot process and will operate as an interface between a legacy-based operating system and the various hardware of the computer system as is currently conventional. If, on the other hand, an EFI layer is to be installed, flow continues to block 232 at which the legacy BIOS launches the EFI utility that, for example, resides in the HPA. When the EFI utility is launched, the EFI utility takes control over the boot process and, as indicated in block 234, builds an EFI layer between the operating system (presumably an EFI-based operating system) and the legacy BIOS. In such a case, the operating system will communicate with the EFI layer, but the legacy BIOS will still be available for communicating with the computer system hardware.

Figure 3:
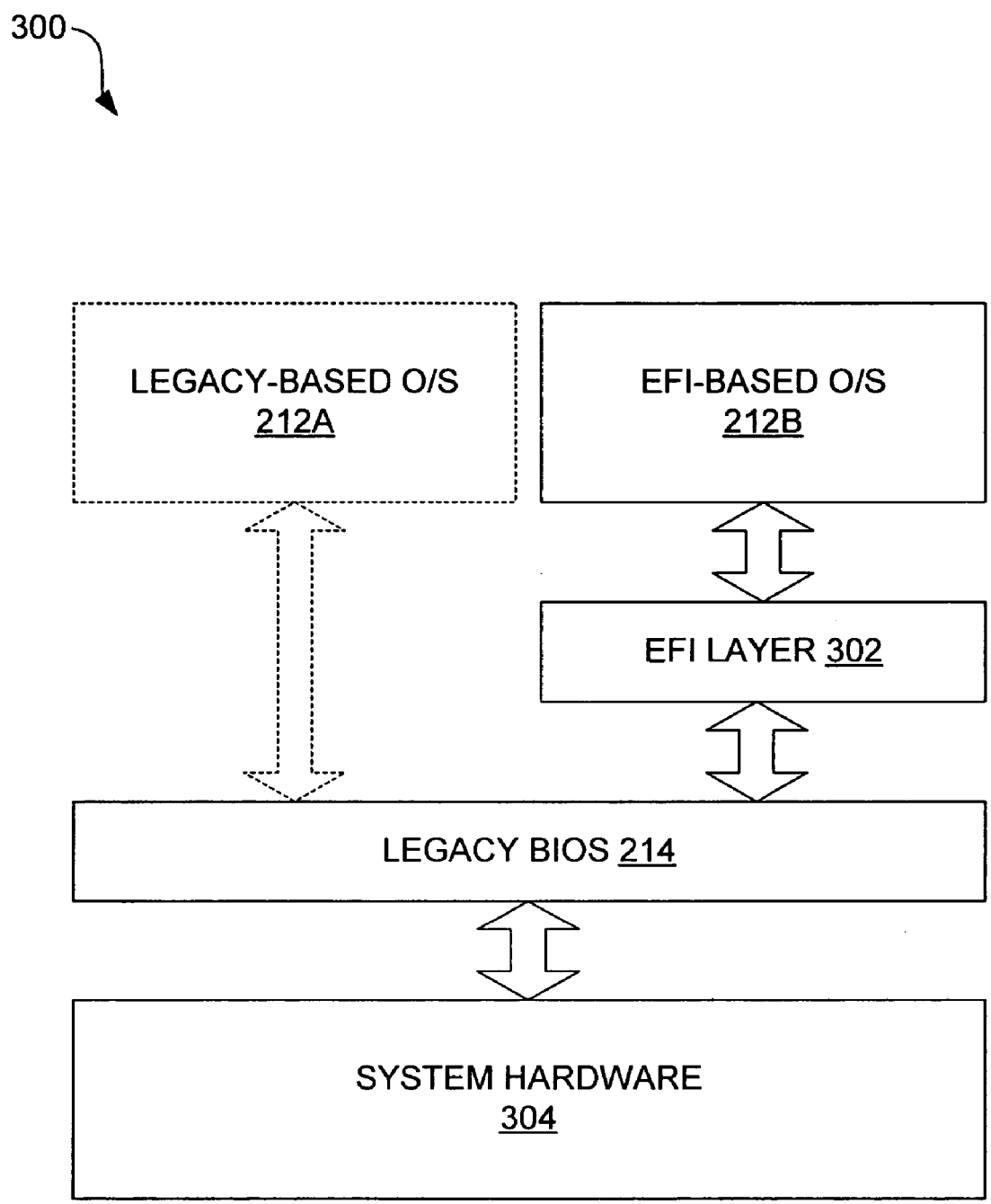
FIG. 3 is a block diagram representing a system configuration that results when an extensible firmware interface is implemented.

FIG. 3 illustrates an example implementation of an EFI. More particularly, FIG. 3 illustrates the system configuration that can result when the legacy BIOS launches the EFI utility as described above in relation to FIG. 2. As is indicated in FIG. 3, the system 300 comprises one or both of a legacy-based operating system 212A and an EFI-based operating system 212B. In cases in which the legacy-based operating system 212A is present and is to be used, the operating system communicates directly with the legacy BIOS 214. In cases in which the EFI-based operating system 212B is to be used, however, the EFI utility builds an EFI layer 302 that resides between the operating system and the legacy BIOS 214. Therefore, the operating system 212B communicates with the EFI layer 302. If the operating system 212B needs to communicate with the system hardware 304, for instance to read data from a system hard disk, a command is communicated to the EFI layer 302, and the EFI layer makes an appropriate request of the legacy BIOS 214, which is configured for direct communication with the system hardware.

Figure 4:
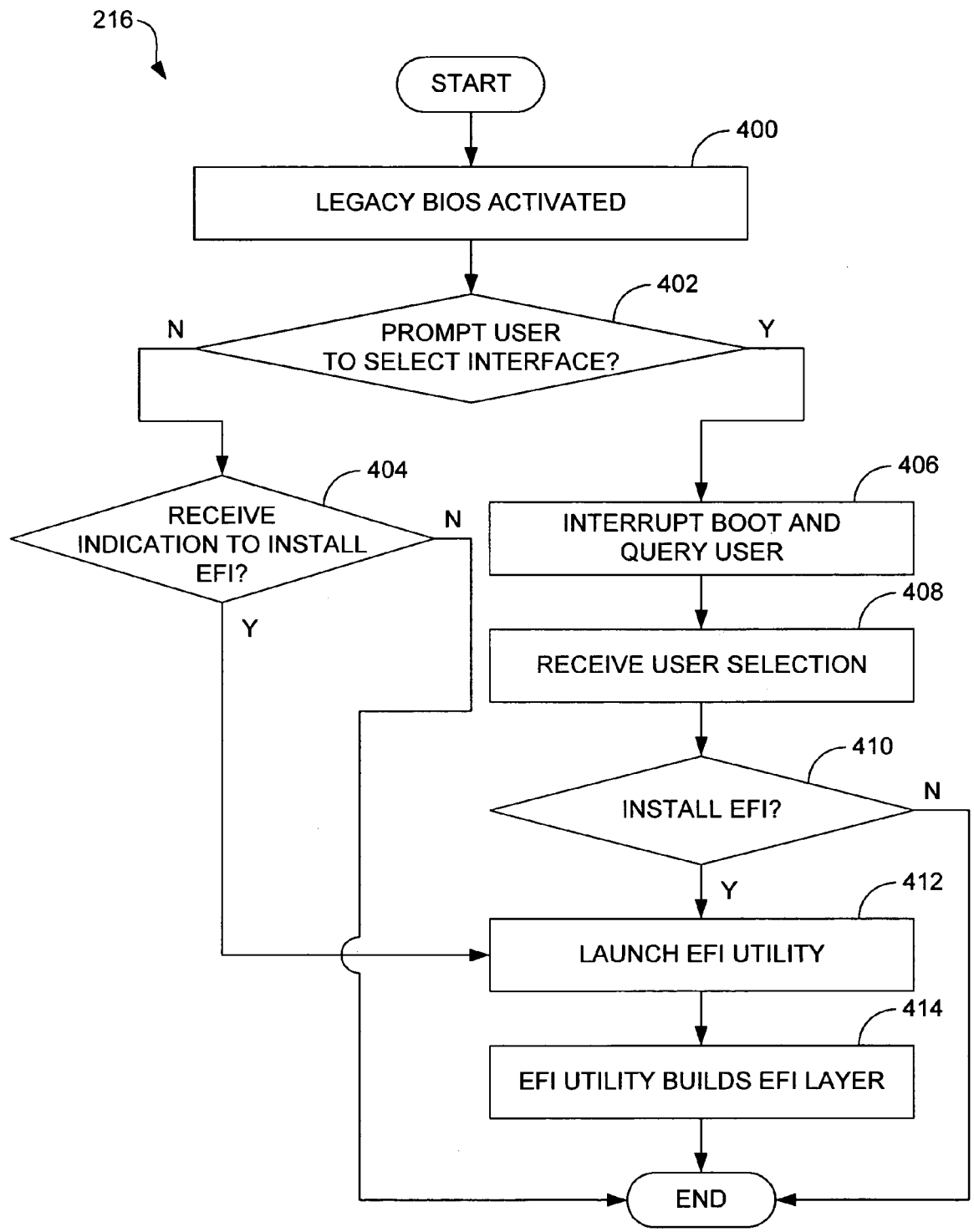
FIG. 4 is a flow diagram that illustrates an embodiment of operation of the EFI implementation system shown in FIG. 1.

FIG. 4 describes an example of operation of the EFI implementation system 214 shown in FIG. 1. Beginning with block 400, the legacy BIOS 214 is activated in a similar manner to that described above in relation to FIG. 2. Once activated, the legacy BIOS 214 controls the boot process and, as indicated in decision block 402, determines whether to prompt the user to select an interface to use. More particularly, the legacy BIOS 214 determines whether to prompt the user to elect between the default legacy BIOS interface or the EFI.

If the legacy BIOS 214 is not configured to prompt the user to choose, flow continues to decision block 404 at which it is determined whether an indication to install the EFI has been received. By way of example, such an indication can be input by the user by selecting an appropriate keyboard button, such as a function key (e.g., the "F10" key). If such an indication were made during the boot process, the legacy BIOS 214 could launch the EFI utility such that the EFI layer will be built and an EFI-based operating system can be used.

If no such indication is received, the system 216 defaults to the legacy BIOS interface and no EFI is installed. However, if an indication that the EFI is desired (e.g., if an EFI-based operating system will be used), flow continues to block 412 described below.

With reference back to decision block 402, if the legacy BIOS 214 is configured to prompt the user to select an interface, flow continues to block 406 at which the BIOS interrupts the boot process and queries the user to elect one of a legacy-based boot or an EFI-based boot. The legacy BIOS 214 then awaits a response to the query and, presumably, a user selection is received, as indicated in block 408.

Referring next to decision block 410, if the user selection indicates that the EFI is not to be installed, the legacy BIOS 214 completes the boot process and no EFI layer will be installed. If, on the other hand, an EFI layer is to be installed, flow continues to block 412 at which the EFI launcher 218 (e.g., of the legacy BIOS 214) launches the EFI utility 220 that, for example, resides in the HPA. When the EFI utility 220 is launched, the EFI utility takes control over the boot process and, as indicated in block 414, builds an EFI layer (302, FIG. 3) between the operating system and the legacy BIOS in the manner described above and depicted in FIG. 3.

With the above-described functionality, a single computer system can be created that is compatible with both legacy-based and EFI-base operating systems. Given that the EFI layer is not installed within the non-volatile memory device that comprises the legacy BIOS, the memory device can be kept relatively small. In addition, given that the legacy BIOS still resides within the computer system, the EFI need not emulate operation of the legacy BIOS, thereby providing a simple solution to the problem of supporting both legacy-based and EFI-based operating systems.

Although implementation of the EFI has been described in the foregoing as being user selected, alternative embodiments are possible. For instance, the legacy BIOS can be configured to determine the configuration of the operating system that will be used during the boot process (i.e., legacy-based or EFI-based) and automatically launch the EFI utility 220 if an EFI-based operating system is detected.

Figure 5:
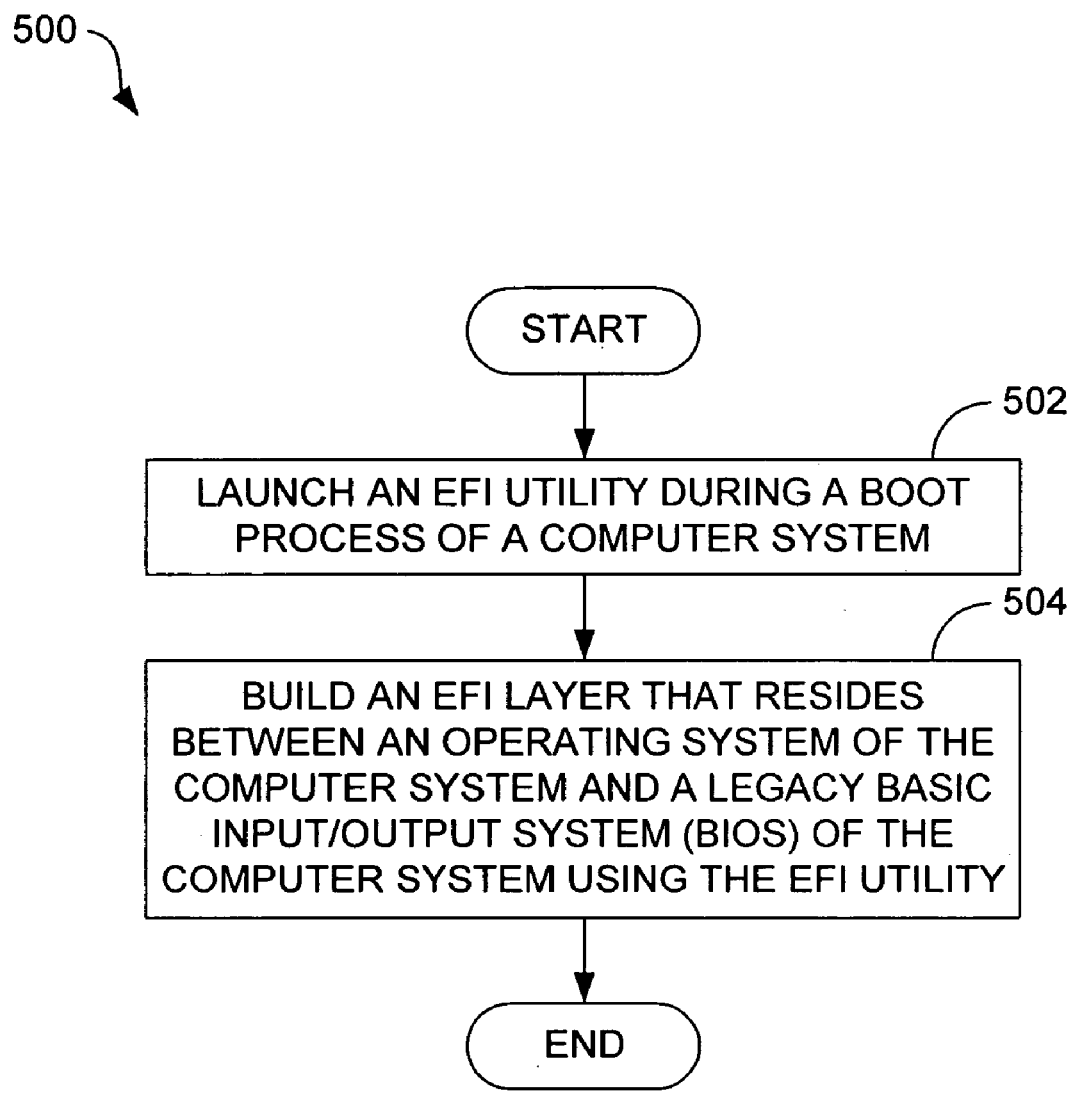
FIG. 5 is a flow diagram that illustrates a further embodiment of a method for implementing an extensible firmware interface.

In view of the foregoing, a method 500 for implementing an extensible firmware interface can be described as is provided in FIG. 5. As is indicated in that figure, the method 500 comprises launching an EFI utility during a boot process of a computer system (502), and building an EFI layer that resides between an operating system of the computer system and a legacy basic input/output system (BIOS) of the computer system using the EFI utility (504).

What is claimed is:

1. A method for implementing an extensible firmware interface (EFI), the method comprising:
    launching an EFI utility during a boot process of a computer system; and
    building an EFI layer that resides between an operating system of the computer system and a legacy basic input/output system (BIOS) of the computer system using the EFI utility.

2. The method of claim 1, wherein launching an EFI utility comprises launching an EFI utility with the legacy BIOS.

3. The method of claim 1, wherein launching an EFI utility comprises launching an EFI utility with the legacy BIOS that resides on a non-volatile memory device of the computing system.

4. The method of claim 1, wherein launching an EFI utility comprises launching an EFI utility that resides in a host protected area (HPA) of a hard disk of the computing system.

5. The method of claim 1, wherein launching an EFI utility comprises launching an EFI utility that resides on a removable disk that is insertable into a disk drive of the computing system.

6. The method of claim 1, wherein building an EFI layer comprises building an EFI layer that is configured to communicate with an EFI-based operating system.

7. The method of claim 1, further comprising prompting a user during the boot process to elect between installing the EFI layer and not installing the EFI layer.

8. The method of claim 7, wherein prompting a user comprises interrupting the boot process with the legacy BIOS.

9. The method of claim 1, further comprising receiving an indication from a user as to whether to install the EFI layer.

10. A system for implementing an extensible firmware interface (EFI), the system comprising:
    means for determining whether to build an EFI layer on a computer system;
    means for launching an EFI utility during a boot process of the computer system; and
    means for building an EFI layer that resides between an operating system of the computer system and a legacy basic input/output system (BIOS) of the computer system using the EFI utility.

11. The system of claim 10, wherein the means for determining comprise part of the legacy BIOS.

12. The system of claim 10, wherein the means for launching comprise an EFI utility launcher of the legacy BIOS.

13. The system of claim 10, wherein the means for building comprise an EFI utility that resides in a host protected area (HPA) of a hard disk of the computing system.

14. An extensible firmware interface (EFI) implementation system stored on a computer-readable medium, the system comprising:
    logic configured to launch an EFI utility during a boot process of a computer system; and
    logic configured to build an EFI layer that resides between an operating system of the computer system and a legacy basic input/output system (BIOS) of the computer system using the EFI utility.

15. The system of claim 14, wherein the logic configured to launch comprises an EFI utility launcher of the legacy BIOS.

16. The system of claim 14, wherein the logic configured to build comprises the EFI utility that resides in a host protected area (HPA) of a hard disk of the computer system.

17. The system of claim 14, wherein the logic configured to build comprises the EFI utility that resides on a removable disk that is insertable into a disk drive of the computer system.

18. The system of claim 14, further comprising logic configured to determine whether to install an EFI layer.

19. A computer system, comprising:
    a processor; and
    a non-volatile memory device that comprises a legacy basic input/output system (BIOS), the legacy BIOS including an extensible firmware interface (EFI) utility launcher that is configured to launch an EFI utility during a boot process of the computer system; and
    a hard disk that comprises an unprotected area that comprises an operating system and a host protected area (HPA) that comprises a bootable EFI utility that is configured to build an EFI layer that resides between the operating system and the legacy BIOS, the EFI layer being configured to communicate with the operating system and the legacy BIOS.

20. The computer system of claim 19, wherein the non-volatile memory device comprises a flash-based memory chip.

* * * * *